United States Patent
Quach et al.

(10) Patent No.: US 7,516,978 B2
(45) Date of Patent: Apr. 14, 2009

(54) ANTI-TELESCOPING INFLATABLE CURTAIN

(75) Inventors: Thanh H. Quach, Macomb, MI (US); Michael J. White, Jr., Dryden, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 377 days.

(21) Appl. No.: 11/292,364

(22) Filed: Dec. 1, 2005

(65) Prior Publication Data

US 2007/0126214 A1    Jun. 7, 2007

(51) Int. Cl.
B60R 21/16    (2006.01)

(52) U.S. Cl. .................................... 280/730.2

(58) Field of Classification Search ............... 280/730.2, 280/743.2, 743.1
See application file for complete search history.

(56) References Cited

U.S. PATENT DOCUMENTS

| | | | | |
|---|---|---|---|---|
| 6,145,879 A | * | 11/2000 | Lowe et al. | 280/743.1 |
| 6,237,943 B1 | * | 5/2001 | Brown et al. | 280/730.2 |
| 6,428,037 B1 | * | 8/2002 | Bakhsh et al. | 280/729 |
| 6,758,490 B2 | * | 7/2004 | Hoeft et al. | 280/730.2 |
| 6,991,255 B2 | * | 1/2006 | Henderson et al. | 280/730.2 |

* cited by examiner

Primary Examiner—Faye M. Fleming
(74) Attorney, Agent, or Firm—Tarolli, Sundheim, Covell & Tummino LLP

(57) ABSTRACT

An apparatus (10) for helping to protect an occupant (28) of a vehicle (12) that has a side structure (16) and a roof (18). The apparatus (10) includes an inflatable vehicle occupant protection device (14) having a stored condition in which the protection device is deflated, rolled up, and positioned extending along the vehicle roof (18). The protection device (16) is inflatable away from the vehicle roof (18) to a deployed condition positioned between the side structure (16) and the vehicle occupant (28). The apparatus (10) also includes a housing (40) for the protection device (16) when in the stored condition. At least one of the housing (40) and the protection device (16) include a portion (200) for blocking telescoping movement of the protection device (14).

12 Claims, 4 Drawing Sheets

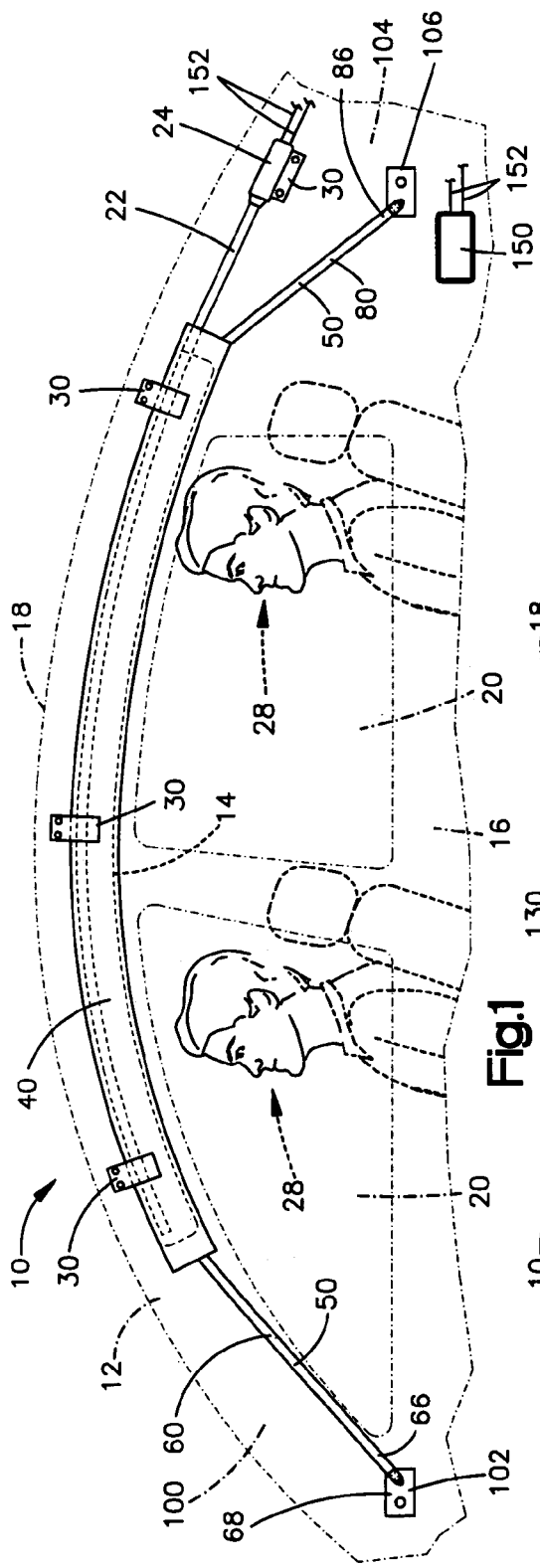
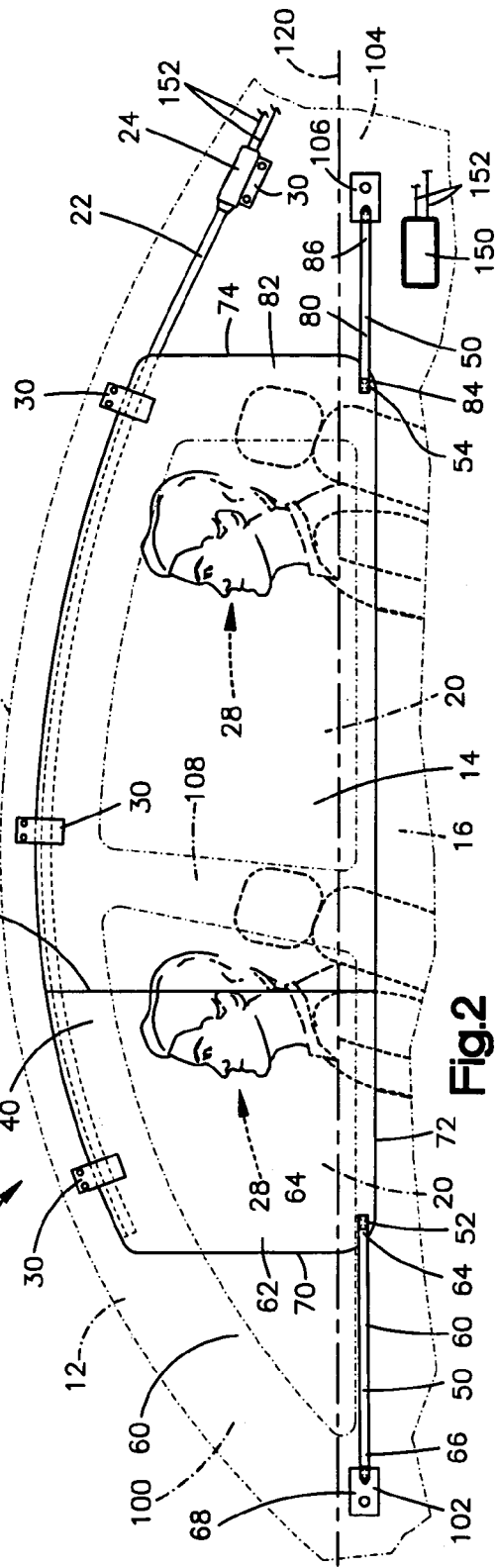

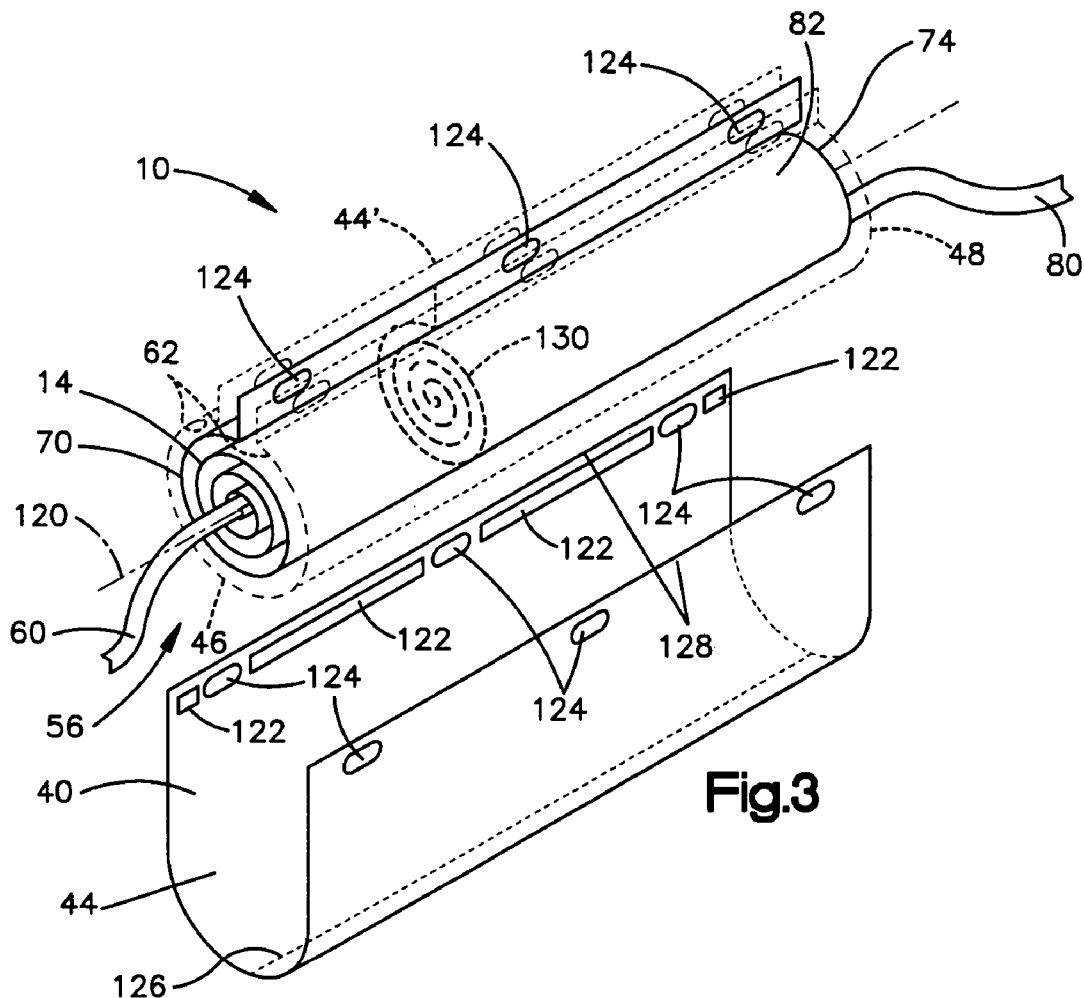
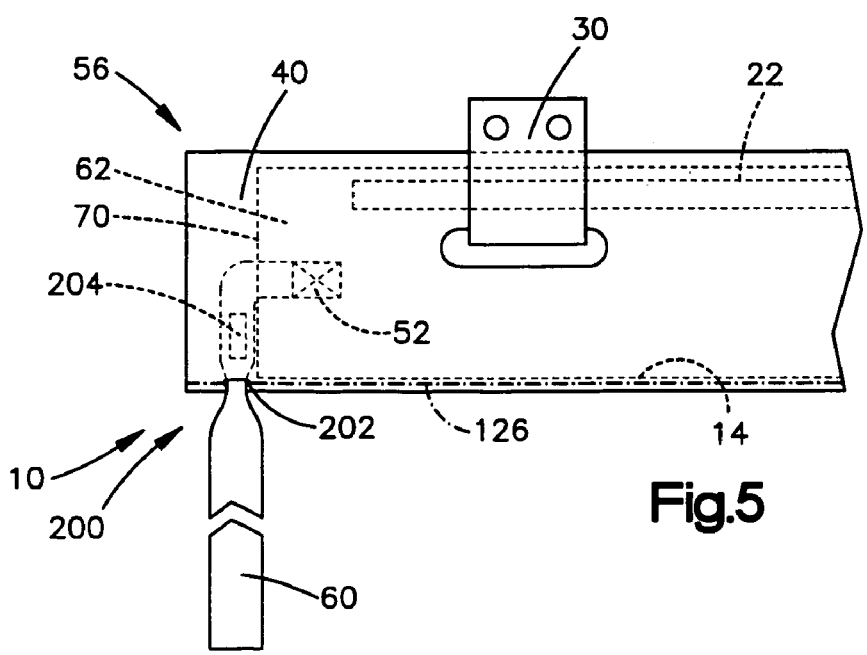

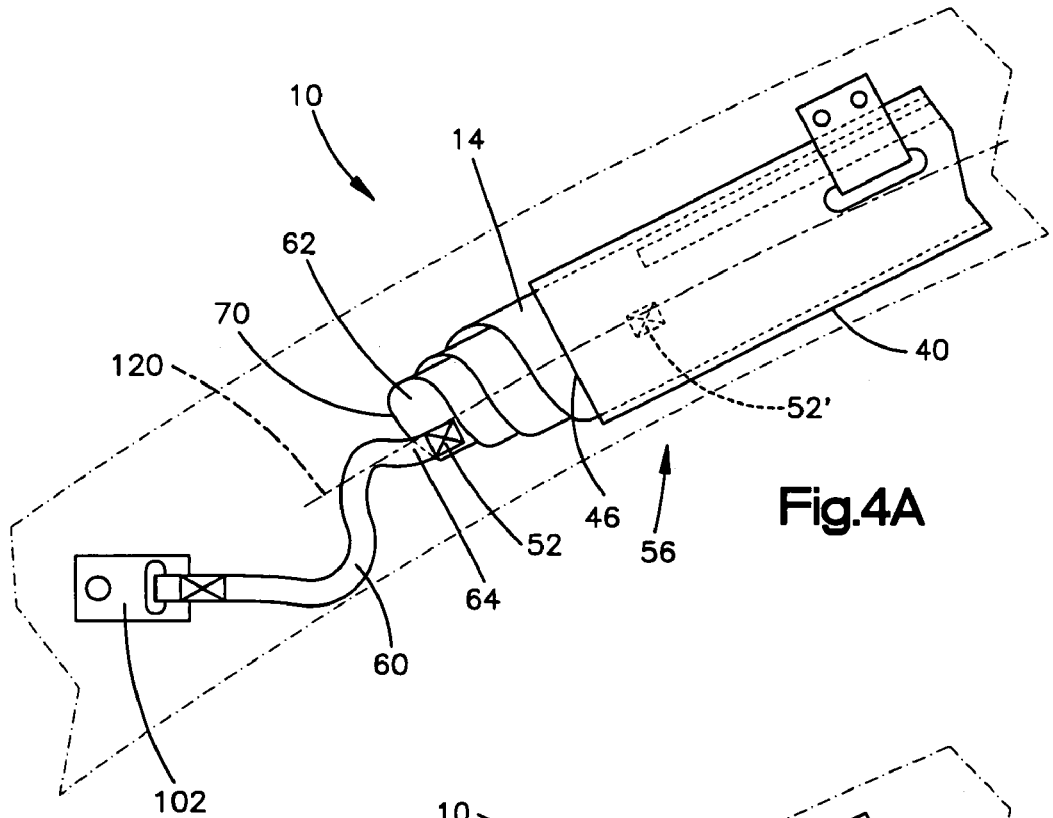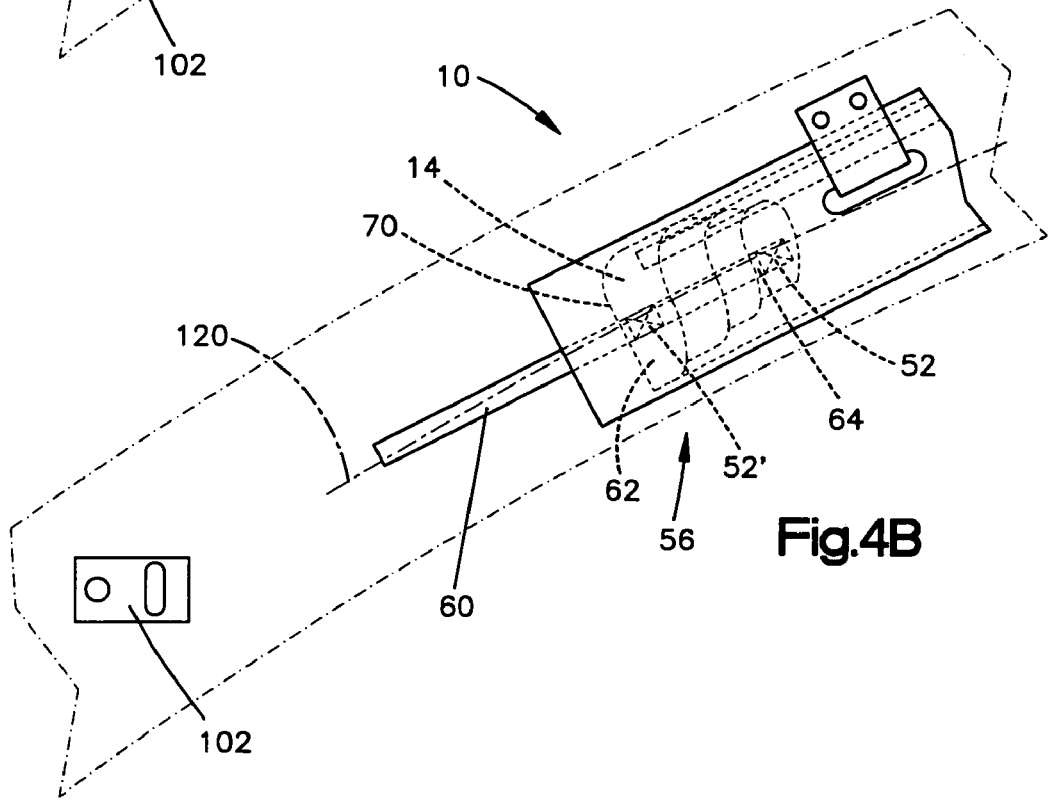

ANTI-TELESCOPING INFLATABLE CURTAIN

TECHNICAL FIELD

The present invention relates to an inflatable vehicle occupant protection device for helping to protect an occupant of a vehicle.

BACKGROUND OF THE INVENTION

It is known to inflate an inflatable vehicle occupant protection device to help protect a vehicle occupant upon the occurrence of an event for which occupant protection is desired, such as a vehicle collision or rollover. One particular type of inflatable vehicle occupant protection device is an inflatable curtain. Inflatable curtains are inflatable away from a vehicle roof to a deployed position between a side structure of the vehicle and a vehicle occupant.

SUMMARY OF THE INVENTION

The present invention relates to an apparatus for helping to protect an occupant of a vehicle that has a side structure and a roof. The apparatus includes an inflatable vehicle occupant protection device having a stored condition in which the protection device is deflated, rolled up, and positioned extending along the vehicle roof. The protection device is inflatable away from the vehicle roof to a deployed condition positioned between the side structure and the vehicle occupant. The apparatus also includes a housing for the protection device when in the stored condition. At least one of the housing and the protection device include a portion for blocking telescoping movement of the protection device.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic view illustrating a stored condition of an apparatus for helping to protect an occupant of a vehicle, according to the present invention;

FIG. 2 is a schematic view illustrating a deployed condition of the apparatus of FIG. 1;

FIG. 3 is an exploded view illustrating the assembly of portions of the apparatus of FIG. 1;

FIGS. 4A and 4B illustrate different conditions of an apparatus for helping to protect an occupant of a vehicle;

FIG. 5 is an enlarged view of a portion of the apparatus of FIG. 1, according to a first embodiment of the present invention.

DESCRIPTION OF EMBODIMENTS

Figure 6A:
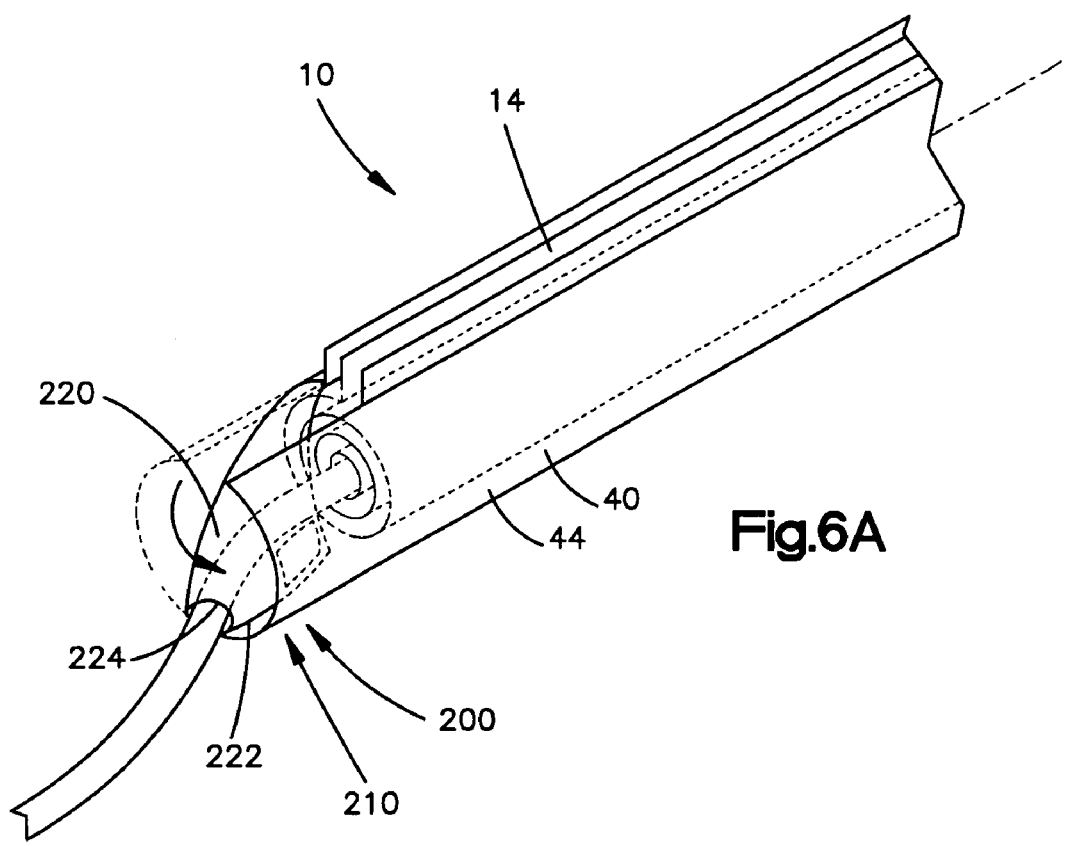
FIGS. 6A and 6B are enlarged views illustrating a portion of the apparatus of FIG. 1, according to a second embodiment of the present invention.

Representative of the present invention, FIGS. 1 and 2 illustrate an apparatus 10 for helping to protect occupants 28 of a vehicle 12. The apparatus 10 includes an inflatable vehicle occupant protection device in the form of an inflatable curtain 14. The inflatable curtain 14 has a stored condition, shown in FIG. 1, in which the deflated curtain is folded, rolled, or folded and rolled, and positioned adjacent the intersection of a side structure 16 and a roof 18 of the vehicle 12. The inflatable curtain 14 is inflatable from the stored position in a direction away from the roof 18 to a deployed position, shown in FIG. 2. In the deployed position, the inflated curtain 14 extends along the side structure 16 and is positioned between the side structure and any occupants 28 of the vehicle 12.

The inflatable curtain 14 can be constructed of any suitable material, such as nylon (e.g., woven nylon 6-6 yarns). The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as polyester yarn, and alternatives coatings, such as silicone, may also be used to construct the inflatable curtain 14.

The apparatus 10 also includes an inflation fluid source in the form of an inflator 24. The inflator 24 is actuatable to provide inflation fluid for inflating the inflatable curtain 14. The inflator 24 may be of any suitable construction or configuration. For example, the inflator 24 may contain a stored quantity of pressurized inflation fluid (not shown) in the form of a gas for inflating the inflatable curtain 14. As another example, the inflator 24 could contain a combination of pressurized inflation fluid and ignitable material for heating the inflation fluid, or could be a pyrotechnic inflator that uses the combustion of gas-generating material to generate inflation fluid. As a further example, the inflator 24 could be of any suitable type or construction for supplying a medium for providing inflation fluid for inflating the inflatable curtain 14.

In the embodiment illustrated in FIG. 1, the inflator 24 is connected in fluid communication with the inflatable curtain 14 through a conduit or fill tube 22. The fill tube 22 may be constructed of any suitable material, such as metal, plastic, or fabric. Alternatively, the fill tube 22 may be omitted and inflation fluid could be discharged into the inflatable curtain 14 from the inflator 24 directly or through a manifold.

The fill tube 22 may also have any suitable configuration. For example, the fill tube 22 may extend substantially along the entire length of the inflatable curtain 14, as shown in FIGS. 1 and 2. Alternatively, the fill tube 22 may extend along any portion of the length of the inflatable curtain 14. The portion of the fill tube 22 positioned in the inflatable curtain 14 includes a plurality of openings (not shown) through which inflation fluid is delivered to the curtain.

The apparatus 10 also includes a housing 40 (FIG. 1) that helps support the inflatable curtain 14 in the stored condition. The housing 40 may have any construction suited to perform the functions described herein. For example, the housing 40 may comprise a sheet of material that is wrapped or otherwise placed around the inflatable curtain 14, thus forming a sheath. The sheet of material may be constructed of any suitable material, such as a fabric (e.g., nylon or polyester) material. The sheet may be secured by known means (not shown in FIG. 1), such as an adhesive, stitching, or heat sealing that interconnects opposite edge portions of the sheet to form the sheath.

As another example, the housing 40 may have an elastomeric or plastic construction in which the housing is molded, extruded, or otherwise manufactured to the requisite (e.g., elongated) configuration for enclosing the inflatable curtain 14. In the plastic construction, the housing 40 is configured to wrap around or otherwise enclose the inflatable curtain and may include means, such as a locking bead, that interconnects portions of the housing to enclose the inflatable curtain 14.

The apparatus 10 is supported in the vehicle 12 by means, such as hooks or brackets 30, that connect the inflatable curtain 14, inflator 24, fill tube 22, housing 40 or any combination thereof to the vehicle in any suitable manner. For example, the brackets 30 may encircle and clamp onto the fill tube 22 or inflator 24. Additionally, the brackets 30 may also extend through apertures (not shown) in the inflatable curtain 14 or housing 40.

The apparatus 10 also includes one or more tethers 50 for helping to connect the inflatable curtain 14 to the vehicle 12. In the embodiment illustrated in FIGS. 1 and 2, the apparatus 10 includes two tethers 50: a first or front tether 60 that connects a front end portion 62 of the inflatable curtain 14 to the vehicle 12, and a second or rear tether 80 that connects a rear end portion 82 to the vehicle. The apparatus 10 may, however, include a front tether 60 only or a rear tether 80 only.

A connection 52 connects a first end portion 64 of the front tether 60 to the front end portion 62 of the inflatable curtain 14. The connection 52 may comprise any suitable means, such as stitching. In the embodiment illustrated in FIGS. 1 and 2, the connection 52 is located adjacent or near the intersection of a front edge 70 and bottom edge 72 of the inflatable curtain 14. The connection 52 could, however, have an alternative location on the inflatable curtain 14, such as one spaced from the front edge 70, spaced from the bottom edge 72, or spaced from both the front edge and bottom edge.

A second end portion 66 of the front tether 60, opposite the first end portion 64, is connected to the side structure 16 of the vehicle 12. For example, the second end portion 66 of the front tether 60 may be connected on or near an A pillar 100 of the vehicle 12, as shown in the embodiment of FIGS. 1 and 2. The front tether 60 could, however, be connected to the vehicle 12 at an alternative location on the side structure 16. The front tether 60 may be connected to the side structure 16 in any suitable manner, such as by looping the tether through a bracket 102 that is secured to the side structure and stitching the tether onto itself.

A connection 54 connects a first end portion 84 of the rear tether 80 to the rear end portion 82 of the inflatable curtain 14. The connection 54 may comprise any suitable means, such as stitching. In the embodiment illustrated in FIGS. 1 and 2, the connection 54 is located adjacent or near the intersection of a rear edge 74 and the bottom edge 72 of the inflatable curtain 14. The connection 54 could, however, have an alternative location on the inflatable curtain 14, such as one spaced from the rear edge 74, spaced from the bottom edge 72, or spaced from both the rear edge and bottom edge.

A second end portion 86 of the rear tether 80, opposite the first end portion 84, is connected to the side structure 16 of the vehicle 12. In the embodiment illustrated in FIGS. 1 and 2, the second end portion 86 of the rear tether 80 is connected on or near a C pillar 104 of the vehicle 12. The rear tether 80 could, however, be connected to the vehicle 12 at an alternative location on the side structure 16. The rear tether 80 may be connected to the side structure 16 in any suitable manner, such as by looping the tether through a bracket 106 that is secured to the side structure and stitching the tether onto itself.

Upon sensing the occurrence of an event for which inflation of the inflatable curtain 14 is desired, such as a side impact, a vehicle rollover, or both, a sensor 150 provides an actuation signal to the inflator 24 via lead wires 152. Upon actuation of the inflator 24, inflation fluid is directed through the fill tube 22 into the inflatable curtain 14. The inflatable curtain 14 inflates and deploys under the pressure of inflation fluid provided by the inflator 24 from the stored position of FIG. 1 to the deployed position of FIG. 2.

In the deployed position, the inflatable curtain 14 is positioned between the side structure 16 and any occupants 28 of the vehicle 12. The inflatable curtain 14, when inflated, extends fore and aft in the vehicle 12 along the side structure 16 and may cover portions of the A pillar 100, C pillar 104 and a B pillar 108 of the vehicle. The inflatable curtain 14 helps absorb impacts with the curtain and helps distribute the energy of impacts throughout a large area of the curtain.

To place the apparatus 10 in the stored condition, the inflatable curtain 14 is rolled up and the housing 40 is secured around the rolled up curtain. In this description, by "rolled up," it is meant to describe that the inflatable curtain 14 may be rolled, folded or a combination of rolled and folded. In a rolled configuration, the inflatable curtain 14 is rolled up about a roll axis. In a folded configuration, the inflatable curtain 14 is folded repeatedly in the same direction, starting adjacent a lower longitudinal edge of the curtain and working up toward an upper longitudinal edge of the curtain. As a further example, the inflatable curtain may be initially rolled up. During installation, however, the rolled up curtain 14 may become flattened out due, for example, to being compressed between the side structure and a vehicle trim piece. In this instance, the initially rolled up curtain 14, or portions of the curtain, may be placed in a generally folded configuration.

An example of the stored condition of the apparatus 10 is shown in FIG. 3. In FIG. 3, the inflatable curtain 14 is placed in the stored condition by rolling up the curtain about a roll axis 120. The rolled up curtain is placed in a housing 40 in the form of a fabric sheath 44. In the assembled condition of the apparatus 10, the sheath 44 is wrapped around the rolled up curtain as indicated generally at 44' to form a curtain package or assembly 56. The front and rear tethers 60 and 80 protrude from opposite ends of the curtain package 56 through open end portions 46 and 48, respectively, of the housing 40.

In the embodiment illustrated in FIG. 3, the sheath 44 is secured in place with an adhesive 122, such as double-sided tape, that interconnects longitudinal edge portions 128 of the sheath. The sheath 44 could, however, be secured using any suitable alternative means, such as glue, stitching, or heat sealing. As shown in FIG. 3, the inflatable curtain 14 and sheath 44 may include apertures 124 that correspond to the brackets 30 (see FIGS. 1 and 2) and may include a tear seam 126 along which the sheath tears upon deployment of the inflatable curtain 14.

When the inflatable curtain 14 is rolled up about the roll axis 120, care is exercised so as to maintain the roll oriented parallel to the roll axis and the front and rear edges 70 and 74 oriented perpendicular to the roll axis. In doing so, points on the inflatable curtain 14 that are aligned with each other vertically (as viewed in FIGS. 1 and 2) or perpendicular to the roll axis 120 prior to rolling the curtain are maintained at about the same axial position when the curtain is rolled up.

To illustrate this point, referring to FIG. 2, front and rear edges 70 and 74 of the curtain extend perpendicular to the roll axis 120. When the curtain 14 is rolled up about the axis 120 as shown in FIG. 3, the front and rear edges 70 and 74 are maintained in a generally spiral configuration and lying on a plane perpendicular to the roll axis. Points on the curtain 14 lying along the front and rear edges 70 and 74 are thus maintained at about the same axial position throughout the roll. To further illustrate this point, an imaginary line 130 on the curtain 14 of FIG. 2 extends perpendicular to the roll axis 120. When the curtain 14 is rolled up as shown in FIG. 3, the line 130 is maintained in a generally spiral configuration and lying on a plane that is perpendicular to the roll axis 120.

The length of the inflatable curtain 14, when rolled up in the manner described above, remains about equal to the overall length of the curtain, as measured parallel to the roll axis 120 between the front and rear edges 70 and 74 of the curtain.

During handling, shipping, and installation of the curtain package 56, however, the inflatable curtain 14 may "telescope" or undergo what is referred to herein as "telescoping" or "telescoping movement." When the inflatable curtain 14 or portions thereof undergo telescoping movement, portions or rolls of the curtain become displaced axially relative to each other. As a result, points on the curtain 14 described above as being maintained lying on a plane perpendicular to the roll axis 120 in a generally spiral configuration become displaced axially and assume a non-planar generally helical configuration. This is illustrated in FIGS. 4A and 4B.

FIGS. 4A and 4B illustrate a portion of the rolled up inflatable curtain 14 that has undergone telescoping movement. For clarity, the portion of the curtain 14 illustrated in FIGS. 4A and 4B is magnified. Therefore, FIGS. 4A and 4B show only a front portion of the inflatable curtain 14, thus illustrating the front end portion 62 of the curtain and the end portion 46 of the housing 40.

FIG. 4A illustrates a telescoped condition of the inflatable curtain 14 in which the inner coils of the rolled up curtain are displaced outward from the housing 40 along the roll axis 120, referred to herein as an "outward telescope." FIG. 4B illustrates a telescoped condition of the inflatable curtain 14 in which the inner coils of the rolled up curtain are displaced inward of the housing 40 along the roll axis 120, referred to herein as an "inward telescope." In both cases, the resulting helical configuration of the front edge 70 is clear.

Those skilled in the art will appreciate that the description of the inflatable curtain 14 relating to FIGS. 4A and 4B is also applicable to and holds true with the rear end portion 82 (see FIGS. 2 and 3) of the curtain and the rear end portion 48 of the housing 40. Thus, when the front end portion 62 and front edge 70 of the curtain 14 are telescoped outward, the rear end portion 82 and rear edge 74 will be correspondingly telescoped inward. Conversely, when the front end portion 62 and front edge 70 of the curtain 14 are telescoped inward, the rear end portion 82 and rear edge 74 will be correspondingly telescoped outward.

As shown in FIGS. 4A and 4B, telescoping of the rolled up curtain 14 alters the axial position of the tether connection 52. When the inflatable curtain 14 is in the telescoped condition of FIG. 4A, the front end portion 62 of the curtain telescopes out through the open end portion 46 of the housing 40. In this condition, the tether connection 52 is displaced outward or to the left relative to the non-telescoped position of the connection, which is illustrated generally in dashed lines at 52' in FIG. 4A. This places the connection 52 axially forward of a non-telescoped position of the connection 52'.

When the inflatable curtain 14 is in the telescoped condition of FIG. 4B, the front end portion 62 of the curtain telescopes inward or away from the open end portion 46 of the housing 40. In this condition, the connection 52 is displaced inward or to the right relative to the non-telescoped position of the connection, which is illustrated generally in dashed lines at 52' in FIG. 4B. This places the connection 52 axially rearward of the non-telescoped position of the connection 52'.

The telescoping conditions of the inflatable curtain 14 illustrated in FIGS. 4A and 4B may create difficulties during installation of the curtain package 56 in the vehicle 12. When the curtain 14 is in the outward telescoping condition (FIG. 4A), the first end portion 64 of the tether 60 is positioned closer to the bracket 102 and, as a result, the tether may be left slacked, as shown in FIG. 4A. In this condition, the slacked tether 60, the telescoped curtain 14, or both, may interfere with the assembly of vehicle components (not shown), such as trim pieces (e.g., a trim piece for the A pillar 100).

When the curtain 14 is in the inward telescoping condition (FIG. 4B), the first end portion 64 of the tether 60 is positioned away from the bracket 102, which shortens the length of the tether 60 protruding from the curtain package 56. This may make it difficult or impossible to connect the tether 60 to the bracket 102 and thus may necessitate re-rolling and re-packaging the inflatable curtain 14.

Referring to FIG. 5, according to the present invention, the apparatus 10 includes a portion 200 for blocking telescoping movement of the inflatable curtain 14. The portion 200 may comprise a portion of the inflatable curtain 14, a portion of the housing 40, or portions of both the curtain and the housing. According to a first embodiment of the invention, the portion 200 comprises an opening or aperture 202 in the housing 40 through which the tether 60 is drawn once the curtain 14 is rolled up. In a configuration where the housing 40 comprises a fabric sheet or sheath, the opening 202 may comprise a slot or hole cut in the sheet by known means, such as a knife, scissors, or a die. In a configuration where the housing 40 comprises a plastic sheet or enclosure, the opening 202 may comprise a slot or hole formed during the molding process or cut or otherwise formed after the housing is formed.

The opening 202 may be sized so as to form an interference fit with the tether 60 to help retain the tether in the opening. The opening 202 is configured to coincide with the front end portion 62 of the rolled up curtain 14 and may, for example, be aligned with the front edge 70 of the curtain. When the inflatable curtain 14 is rolled up and placed in the housing 40, the tether 60 is inserted through the opening 202, as shown in FIG. 5, and drawn taut. A releasable fastening means 204, such as tape, may be used to secure the tether 60 to the housing 40 and maintain the tether tensioned between the fastening means and the connection 52 between the tether and the inflatable curtain 14.

The tether 60, being drawn taut and secured in the opening 202, helps prevent relative movement between the curtain 14 and the housing 40. The tether 60 thus helps prevent both inward telescoping and outward telescoping of the inflatable curtain 14. This helps facilitate a quick, simple, and trouble-free installation of the curtain package 56 in the vehicle 12. Once the curtain package 56 is installed, the tether 60 can be removed from the opening 202 by pulling the tether back through the opening. The tether 60 can then be connected to the bracket (not shown in FIG. 5) to complete installation of the apparatus.

As an alternative, the tear seam 126 of the housing 40 may coincide with the opening 202. In this configuration, the tether 60 would be released from the opening 202 when the tear seam 126 ruptures in response to the inflating curtain 14. This configuration would therefore allow the tether 60 to be connected to the bracket 102 without removing it from the opening 202.

Figure 6B:
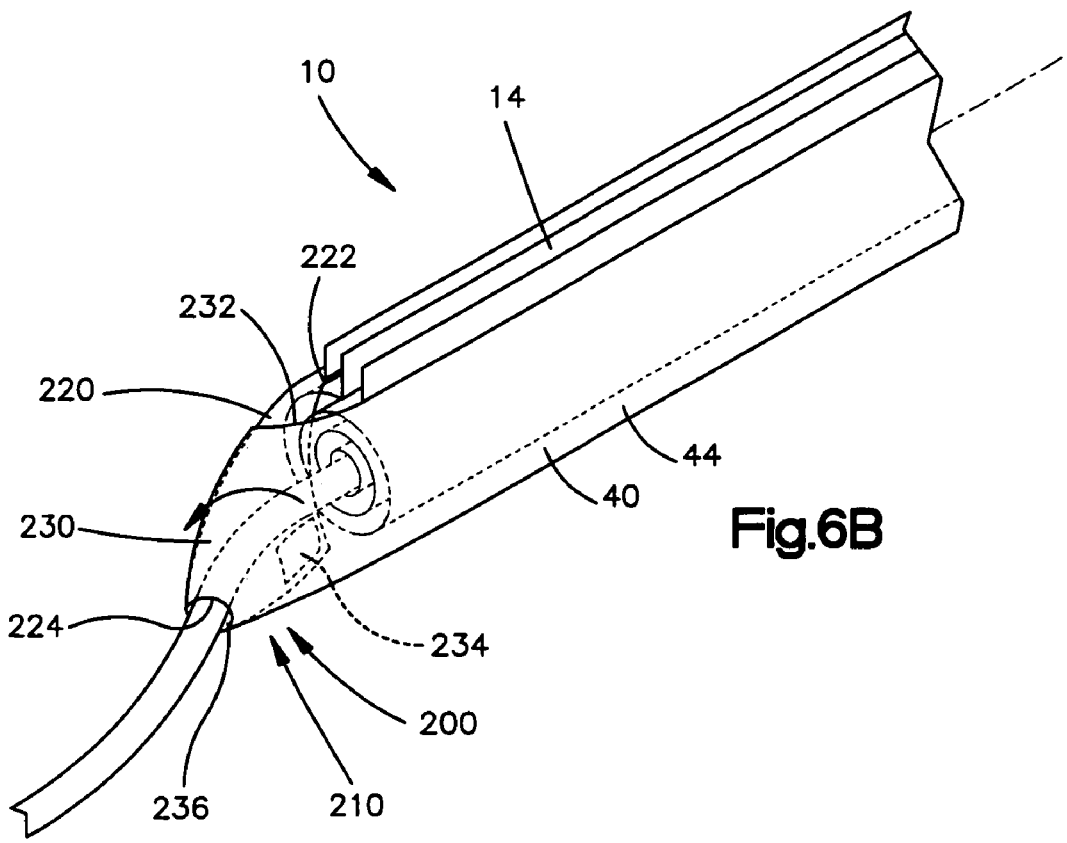

Referring to FIGS. 6A and 6B, according to a second embodiment of the invention, the apparatus 10 includes a housing 40 in the form of a fabric sheath 44. In this embodiment, the portion 200 for blocking telescoping movement comprises an end portion 210 of the fabric sheath 44 that extends beyond the rolled up curtain 14 and is folded or wrapped to further enclose the curtain in the sheath 44.

As shown in FIG. 6A, the sheath 44 is initially wrapped or otherwise positioned facing concavely upward in a generally U-shaped configuration around the rolled up curtain 14. The end portion 210 includes a portion 220 of the sheath 44 that is folded over in the direction indicated generally by the arrow in FIG. 6A. The portion 220 is a corner portion of the sheath 44 that includes portions of a first longitudinal edge 222 and a front edge 224 of the sheath.

As shown in FIG. 6B, the end portion 210 also includes a portion 230 of the sheath 44 that is folded over in the direction indicated generally by the arrow in FIG. 6B. The portion 230 is a corner portion of the sheath 44 that includes portions of a second longitudinal edge 232 and the front edge 224 of the sheath.

As shown in FIG. 6B, the portions 220 and 230 are twisted or wrapped to give the end portion 210 a generally tapered or cone-shaped configuration. The portions 220 and 230 and the longitudinal edges 222 and 232 are secured in the position of FIG. 6B by means 234, such as an adhesive (e.g., two-sided tape). This helps maintain the end portion 210 of the sheath 40 in a generally tapered, cone-shaped configuration with the tether 60 protruding through an opening 236 at a terminal end of the portion.

The end portion 210 helps block relative movement between the curtain 14 and the sheath 40, which helps prevent telescoping movement of the curtain. This helps facilitate a quick, simple, and trouble-free installation of the curtain package 56 in the vehicle 12. Once the curtain package 56 is installed, the tether can be connected to the bracket 102 to complete installation of the apparatus 10.

From the above description of the invention, those skilled in the art will perceive applications, improvements, changes and modifications to the present invention. Such applications, improvements, changes and modifications within the skill of the art are intended to be covered by the appended claims.

Having described the invention, we claim the following:

1. An apparatus for helping to protect an occupant of a vehicle that has a side structure and a roof, the apparatus comprising:
   an inflatable vehicle occupant protection device having a stored condition in which the protection device is deflated, rolled up, and positioned extending along the vehicle roof, the protection device being inflatable away from the vehicle roof to a deployed condition positioned between the side structure and a vehicle occupant; and
   a housing for the protection device when in the stored condition, at least one of the housing and the protection device comprising a portion for preventing telescoping movement of the protection device;
   wherein the portion for preventing telescoping movement comprises a portion of the housing that prevents telescoping movement of the protection device.

2. The apparatus recited in claim 1, further comprising a tether having a first end portion connected to the protection device and an opposite second end portion connectable with the side structure of the vehicle, wherein the portion for preventing telescoping movement comprises an opening in a sheet of material through which the tether extends to help prevent the protection device from telescoping.

3. The apparatus recited in claim 2, wherein the opening is sized so as to form an interference fit with the tether to help maintain the position of the tether in the opening.

4. The apparatus recited in claim 2, wherein the housing comprises a tear seam that intersects the opening, the tear seam being rupturable upon inflation of the protection device to allow the protection device to inflate and deploy and to release the tether from the opening.

5. An apparatus for helping to protect an occupant of a vehicle that has a side structure and a roof, the apparatus comprising:
   an inflatable vehicle occupant protection device having a stored condition in which the protection device is deflated, rolled up, and positioned extending along the vehicle roof, the protection device being inflatable away from the vehicle roof to a deployed condition positioned between the side structure and a vehicle occupant; and
   a housing for the protection device when in the stored condition, at least one of the housing and the protection device comprising a portion for preventing telescoping movement of the protection device;
   wherein the housing comprises a fabric sheath wrapped around the protection device while deflated and rolled up to help support the protection device in the stored condition, the portion for preventing telescoping movement comprising portions of the sheath that are folded over to prevent the protection device from telescoping.

6. The apparatus recited in claim 5, wherein the folded portions of the sheath place an open end portion of the sheath in a tapered configuration that helps prevent the protection device from telescoping through the open end portion.

7. The apparatus recited in claim 6, further comprising an adhesive for securing the portions of the sheath while folded over to help prevent telescoping movement of the protection device through the open end portion.

8. The apparatus recited in claim 5, further comprising a tether having a first end portion connected to the protection device and an opposite second end portion connectable with the side structure of the vehicle, wherein the folded portions of the sheath are folded around the tether to allow the tether to extend outside the sheath while the protection device is in the stored condition inside the sheath.

9. An apparatus for helping to protect an occupant of a vehicle that has a side structure and a roof, the apparatus comprising:
   an inflatable vehicle occupant protection device having a stored condition in which the protection device is deflated, rolled up, and positioned extending along the vehicle roof, the protection device being inflatable away from the vehicle roof to a deployed condition positioned between the side structure and a vehicle occupant; and
   a housing for the protection device when in the stored condition, at least one of the housing and the protection device comprising a portion for preventing telescoping movement of the protection device;
   wherein the protection device has a terminal edge portion arranged in a generally spiral configuration when the protection device is in the stored condition, the portion for preventing telescoping movement helping maintain the spiral configuration of the terminal edge portion while the protection device is supported in the stored condition by the housing.

10. The apparatus recited in claim 9, wherein the portion for preventing telescoping movement of the protection device helps prevent relative axial displacement of portions of the protection device that would place the edge portion of the protection device in a helical configuration.

11. The apparatus recited in claim 1, wherein the protection device when in the stored position is rolled about a roll axis such that an imaginary line on the protection device perpendicular to the roll axis is rolled up into a generally spiral configuration when the protection device is rolled up, the portion for preventing telescoping movement helping maintain the spiral configuration of the imaginary line while the protection device is supported in the stored condition by the housing.

12. The apparatus recited in claim 11, wherein the portion for preventing telescoping movement of the protection device helps prevent relative axial displacement of portions of the protection device that would place the imaginary line in a helical configuration.

* * * * *